(12) United States Patent
Dolman

(10) Patent No.: US 8,941,032 B2
(45) Date of Patent: Jan. 27, 2015

(54) HARDFACING FERROALLOY MATERIALS

(76) Inventor: Kevin Francis Dolman, Epping (AU)

(*) Notice: Subject to any disclaimer, the term of this patent is extended or adjusted under 35 U.S.C. 154(b) by 1883 days.

(21) Appl. No.: 10/598,058

(22) PCT Filed: Feb. 15, 2005

(86) PCT No.: PCT/AU2005/000191
§ 371 (c)(1),
(2), (4) Date: Apr. 19, 2007

(87) PCT Pub. No.: WO2005/078156
PCT Pub. Date: Aug. 28, 2005

(65) Prior Publication Data
US 2008/0251507 A1   Oct. 16, 2008

(30) Foreign Application Priority Data
Feb. 16, 2004   (AU) ................. 2004900769

(51) Int. Cl.
| | | |
|---|---|---|
| C22C 30/00 | (2006.01) |
| B23K 35/30 | (2006.01) |
| B23K 35/32 | (2006.01) |
| C22C 1/10 | (2006.01) |
| C22C 27/06 | (2006.01) |
| C22C 33/02 | (2006.01) |
| C22C 38/38 | (2006.01) |
| C23C 26/02 | (2006.01) |
| B23K 9/04 | (2006.01) |

(52) U.S. Cl.
CPC ............ *C22C 30/00* (2013.01); *B23K 35/3053* (2013.01); *B23K 35/327* (2013.01); *C22C 1/1068* (2013.01); *C22C 27/06* (2013.01); *C22C 33/0207* (2013.01); *C22C 38/38* (2013.01); *C23C 26/02* (2013.01); *B22F 2998/10* (2013.01); *B23K 9/04* (2013.01); *B23K 35/308* (2013.01)
USPC .................................................. 219/146.51

(58) Field of Classification Search
USPC ......... 219/146.51, 146.31, 146.1; 420/15, 72; 148/24
See application file for complete search history.

(56) References Cited

U.S. PATENT DOCUMENTS

| | | | | | |
|---|---|---|---|---|---|
| 1,708,815 | A | * | 4/1929 | Wille | 219/146.24 |
| 2,515,463 | A | * | 7/1950 | McKenna | 423/440 |
| 2,807,562 | A | * | 9/1957 | Shrubsall | 148/26 |
| 3,012,880 | A | | 12/1961 | Elbum et al. | |
| 3,334,975 | A | * | 8/1967 | Quaas et al. | 428/555 |
| 3,597,583 | A | * | 8/1971 | Hulsewig | 219/146.41 |
| 3,663,313 | A | * | 5/1972 | Oberly et al. | 148/23 |
| 3,862,840 | A | * | 1/1975 | Nayar | 419/25 |
| 3,890,137 | A | * | 6/1975 | Beyer et al. | 75/252 |
| 4,415,532 | A | * | 11/1983 | Crook | 420/585 |
| 4,430,297 | A | * | 2/1984 | Crook | 420/442 |
| 4,487,630 | A | * | 12/1984 | Crook et al. | 420/36 |
| 5,252,149 | A | | 10/1993 | Dolman | |
| 5,695,825 | A | * | 12/1997 | Scruggs | 427/449 |
| 5,803,152 | A | | 9/1998 | Dolman | |
| 5,879,743 | A | * | 3/1999 | Revankar | 427/191 |

FOREIGN PATENT DOCUMENTS

| | | | | |
|---|---|---|---|---|
| AU | 56568 86 | | 4/1986 | |
| CA | 2149010 | A1 | 10/1995 | |
| DE | 36 13 389 | | 11/1986 | |
| EP | 266149 | B1 | 1/1995 | |
| GB | 1504547 | A | 3/1978 | |
| GB | 1504577 | A | 3/1978 | |
| GB | 2039950 | A * | 8/1980 | ............ C22C 19/05 |
| GB | 2 128 633 | | 5/1984 | |
| WO | WO 84/04760 | | 12/1984 | |
| WO | WO 01/96618 | | 12/2001 | |

OTHER PUBLICATIONS

PCT International Search Report for International Application No. PCT/AU05/00191; Apr. 5, 2005; 2 pages.
Supplementary European Search Report for International Application PCT/AU2005/000191, Mar. 17, 2009, 4 pages.

\* cited by examiner

*Primary Examiner* — Dana Ross
*Assistant Examiner* — Frederick Calvetti
(74) *Attorney, Agent, or Firm* — Fish & Richardson P.C.

(57) ABSTRACT

A method of producing a carbide-containing ferroalloy welding consumable material and a method of producing a hardfacing on a suitable substrate using the consumable material are disclosed. The method of producing the consumable material comprises the steps of forming a homogeneous melt that has a required concentration of key elements, such as carbon, chromium and manganese, for the consumable material and forming a consumable material from the melt.

11 Claims, No Drawings

HARDFACING FERROALLOY MATERIALS

SUMMARY

The present invention relates to hardfacing ferroalloy materials containing predominantly chromium carbides and carbides formed from other strong carbide forming elements such as molybdenum, titanium, tungsten, vanadium, niobium and boron.

Ferroalloy materials containing carbides have been used extensively for many years as consumables for hardfacing weld deposits on substrates in applications where resistance to severe erosion and abrasion is required.

One such application is chromium carbide ferroalloy material hardfacing weld deposits on discharge chutes for crushers in mineral processing plants.

When hardfacings of chromium carbide ferroalloy materials are formed by welding onto substrates, the desired microstructure for the weld deposits that form the hardfacings is hypereutectic containing about 30-60 volume % of $M_7C_3$ carbides in a ferrous matrix (M=Cr, Fe and Mn), a nominal hardness of the $M_7C_3$ carbides of 1200-1500 HV, and a nominal hardness of the ferrous matrix of 600-700 HV.

In general, higher carbide contents in the microstructure yield greater wear resistance. There is a direct correlation between the $M_7C_3$ carbide content in the microstructure and the chemically combined carbon content in the weld metal used to form the hardfacings.

The welding consumables for chromium carbide ferroalloy material hardfacings usually comprise a blend of ferroalloy powders and iron.

The ferroalloy powders may be encapsulated in an iron foil to produce either a stick electrode or a continuous filler wire which melts in a molten weld pool. Alternatively, the ferroalloy powders may be added to a molten weld pool formed by a solid iron wire consumable electrode.

Typical Prior Art Ferroalloy Powder Blend

A typical blend of high carbon ferrochromium (HCFeCr) and high carbon ferromanganese (HCFeMn) powders used as welding consumables in the production of a chromium carbide ferroalloy material hardfacing is shown in Table 1.

TABLE 1

| Prior Art Ferroalloy Powder Blend | | | | | |
|---|---|---|---|---|---|
| | Weight % | % Cr | % C | % Mn | % Fe |
| HCFeCr | 94 | 67 | 8.5 | | 24.5 |
| HCFeMn | 6 | | 7.0 | 75 | 18.0 |
| Powder Blend | 100 | 63.0 | 8.4 | 4.5 | 24.1 |

The final ferroalloy powder blend set out in Table 1 above, with a chemical composition of Fe-63Cr-8.4C-4.5Mn, is made up of 94 weight % HCFeCr (nominal composition=Fe-67Cr-8.5C) mixed with 6 weight % HCFeMn (nominal composition=Fe-75Mn-7.0C).

It is evident from the above that the chromium/carbon ratio of the final ferroalloy powder blend=63.0/8.4 ie for the Ferroalloy Powder Blend Cr/C = 7.50

Both the HCFeCr and HCFeMn may contain approximately 1% silicon and minor amounts of other trace elements. These constituents are ignored in these calculations.

Both HCFeCr and HCFeMn are brittle, friable materials and, in order to form suitable welding consumables, are individually crushed into powders with a particle size less than 1 mm in diameter using standard crushing equipment employed in the mineral processing industry. The powders are then mechanically mixed to produce a uniform blend of ferroalloy powders.

Other ferroalloy powders such as ferromolybdenum, ferrovanadium, ferroniobium, ferroboron and ferrotitanium may be added to the blend to impart different material properties to the weld pool and to the resultant hardfacing.

Typical Prior Art Hardfaced Weld Deposit

The chemistry of a hardfacing that deposits onto a mild steel substrate from a weld pool containing the blended ferroalloy powders described above is illustrated by way of example in Table 2. The hardfacing is referred to as the "hardfacing weld deposit" in the Table and hereinafter.

TABLE 2

| Prior Art Hardfacing Weld Deposit | | | | | |
|---|---|---|---|---|---|
| | Weight % | % Cr | % C | % Mn | % Fe |
| Powder Blend | 55 | 63.0 | 8.4 | 4.5 | 24.1 |
| Welding wire | 35 | | | 1.0 | 99.0 |
| Dilution | 10 | | 0.2 | 1.0 | 98.8 |
| Weld Deposit | 100 | 34.7 | 4.6 | 2.9 | 57.8 |

In the example of Table 2, the hardfacing weld deposit on the mild steel substrate is made up of 55 weight % ferroalloy powder blend plus 35 weight % Fe welding wire plus 10 weight % dilution into the substrate.

Dilution of the hardfacing weld deposit is understood herein as the depth of penetration into the mild steel substrate divided by the final height of the hardfacing weld deposit. For example, a typical 5 mm thick hardfacing weld deposit may penetrate a mild steel substrate to a depth of approximately 0.5 mm during the welding process resulting in a dilution of 10% (0.5/5.0).

The chemistry of the hardfacing weld deposit in this example is Fe-34.7Cr-4.6C-2.9Mn. The microstructure comprises approximately 50 volume % of $M_7C_3$ carbides in a ferrous matrix.

It is evident from the above that the chromium/carbon ratio for the Hardfacing=34.7/4.6 ie for the Hardfacing Weld Deposit Cr/C = 7.54

Limitations of the Prior Art

The limitations of the above-described prior art and other prior art known to the applicant in the manufacture and use of ferroalloy powders for producing hardfacing weld deposits are:

1. The chromium content in the final hardfacing is very high (34.7% Cr in the above example) compared to the chromium content in suitable wear resistant white cast irons specified, for example, in ASTM A532 and AS 2027. The higher chromium content is a direct result of maximising the amount of combined carbon (4.6% C) in the hardfacing weld deposit by adding as much ferrochromium powder as possible in the blended welding consumable. That is, excessive amounts of the higher cost chromium are tolerated in order to maximise the carbon content in the final weld deposit. Adding free carbon powder to the ferroalloy blend in order to increase the carbon content in the final weld deposit is not effective since the free carbon does not readily dissolve in the molten weld pool during the relatively short arc melting time (nominally 2 to 5 seconds) to form hardfacing weld deposits on substrates.

2. Attempts to add other ferroalloys, such as ferrotitanium, ferrovanadium, ferroniobium, ferroboron and ferromolybdenum, to the above ferroalloy powder blend cause an undesirable reduction in the carbon content of the final blend and the subsequent hardfacing weld deposit since commercially available grades of FeTi, FeV, FeB, FeNb and FeMo contain relatively low chemically combined carbon contents.

3. The above-described prior art blend of ferroalloy powders is obtained by mechanically mixing the HCFeCr and HCFeMn powders together. Mechanical mixing is a slow and inefficient means of obtaining a homogeneous powder blend. The degree of difficulty in achieving a homogeneous mixture of the powder blend increases when other ferroalloy powders such as FeTi and FeV are included in the mix. In addition, segregation of the blended powders tends to occur on handling and transport after mixing due to density differences between the various ferroalloys.

4. The principal ferroalloy powders in hardfacing weld deposits are obtained by crushing lump HCFeCr and lump HCFeMn which are sourced from suppliers of furnace charge materials that are used for the production of white iron castings. Experience has shown that these materials contain varying amounts of volatile gases, which evolve violently during the welding process causing arc instability and ejection of some ferroalloy powder from the weld pool. The resultant hardfacing weld deposits contain gas porosity, varying amounts of ferroalloy ingredients and varying amounts of dilution into the steel substrate. The final hardfacing weld deposits are generally not uniform in chemical composition and microstructure and can lead to localised premature wear in service.

DESCRIPTION OF THE INVENTION

The present invention is a method of producing improved hardfacing weld deposits compared to the prior art in a cost-effective manner.

The method has been developed to overcome or at least minimise one or more of the four technical disadvantages of chromium carbide ferroalloy material hardfacing welding consumables described above that have been used previously.

The present invention is based on the realisation that improved hardfacing weld deposits can be produced by using a quite different method to produce ferroalloy welding consumables that are required to form the hardfacing weld deposits.

According to the present invention there is provided a method of producing a chromium carbide-containing ferroalloy welding consumable material for subsequent use for producing a hardfacing weld deposit on a suitable substrate which comprises:

(a) forming a homogeneous melt that has a required concentration of key elements, such as carbon and chromium, for a chromium carbide-containing ferroalloy welding consumable material; and (b) forming a solid chromium carbide-containing ferroalloy welding consumable material from the melt.

Preferably step (a) comprises forming the homogeneous melt from solid feed materials.

Preferably step (a) comprises forming the homogeneous melt from a chromium-containing ferroalloy material.

Preferably step (a) comprises forming the homogeneous melt from one or more additional ferroalloy materials such as ferromanganese, ferromolybdenum, ferrovanadium, ferroboron and ferrotitanium.

Preferably step (a) comprises forming the homogeneous melt from a source of free carbon, such as graphite.

Preferably step (a) comprises forming the homogeneous melt from an iron-containing material (other than a chromium-containing ferroalloy) such as scrap steel or scrap high chromium white cast iron, to dilute the chromium concentration in the melt.

Preferably step (a) comprises holding the melt temperature for a relatively long holding time (nominally 30 to 60 minutes) to dissolve carbon in the melt to produce a desired level of chemically combined carbon in the solid ferroalloy welding consumable material from the melt.

Preferably the method comprises mixing the melt and forming the homogenous melt during a required time period at temperature so that the solid ferroalloy welding consumable material has a uniform composition.

Preferably the method comprises de-gassing the melt formed in step (a) so that the solid ferroalloy welding consumable material formed in step (b) facilitates a stable welding arc in a subsequent hardfacing operation and thereby minimises porosity in the resultant hardfacing weld deposit and eliminates ejection of ferroalloy powder from the weld pool.

Preferably the method comprises removing slag from the melt formed in step (a) so that the solid ferroalloy welding consumable material formed in step (b) minimises the presence of non-metallic impurities in the resultant hardfacing weld deposit formed in the subsequent hardfacing operation.

Typically, the solid ferroalloy welding consumable material formed in step (b) is in the form of a powder.

Preferably the method comprises producing a ferroalloy welding consumable material having a chromium/carbon ratio <7.0.

Preferably the method comprises producing a ferroalloy welding consumable material having chromium content in the range 30-65 weight %.

Preferably the method comprises producing a ferroalloy welding consumable material having a chemically combined carbon content greater than 7.5 weight %.

Preferably the method comprises producing a ferroalloy welding consumable material having manganese content up to a maximum of 10 weight %.

Preferably the method comprises producing a ferroalloy welding consumable material having one or more than one of the following additional alloying elements: tungsten, titanium, niobium, vanadium, molybdenum, and boron.

Typically, step (a) of the method comprises combining and melting ferroalloy feed materials, which may be in lump form, in a suitable melting furnace.

Step (a) may comprise adding inexpensive scrap metal to the melt to lower the amount of chromium content in the melt in order to achieve a Cr/C<7.0.

Step (a) may comprise adding graphite to the melt to supersaturate the melt with carbon in order to achieve a Cr/C<7.0.

Preferably step (b) of forming the solid ferroalloy welding consumable material from the melt comprises casting the melt into a suitable mould(s) or other casting means and thereafter breaking up the cast product into a suitable form, such as powder form.

In an alternative, although not the only other, embodiment step (b) of forming the solid ferroalloy welding consumable material from the melt comprises atomising the melt with a suitable gas, such as argon, to form solid powder from the melt.

In addition to making it possible to produce ferroalloy welding consumables having suitable chemistry for forming hardfacing weld deposits, the method of producing ferroalloy welding consumables according to the invention has a number of other practical advantages.

For example, the alloying materials are very efficiently mixed in the molten state to produce a more homogeneous ferroalloy blend than that achieved by mechanically mixing ferroalloy powders as described in the prior art. Segregation of the premixed ferroalloy powder does not occur on subsequent handling or transport.

All volatiles present in the lump ferroalloy materials fully outgas during the melting process and this eliminates a major source of gas porosity in the final weld metal and improves the stability of the welding arc during the weld deposition process.

Non-metallic impurities present in the initial ferroalloy charge materials are readily removed by de-slagging the molten metal in the furnace with suitable fluxing agents.

According to the present invention there is also provided a chromium carbide-containing ferroalloy welding consumable material produced by the above method.

According to the present invention there is also provided a method of producing a hardfacing weld deposit on a suitable substrate which comprises forming a weld pool of the above-described chromium carbide-containing ferroalloy welding consumable material and a welding wire material on a substrate and thereafter depositing a hardfacing weld deposit of material from the weld pool on the substrate.

According to the present invention there is provided a hardfacing weld deposit on a suitable substrate produced by the above method.

Preferably the hardfacing weld deposit comprises a chromium/carbon ratio <7.0.

Preferably the hardfacing weld deposit comprises a chromium content of less than 35 weight %.

Preferably the hardfacing weld deposit comprises a combined carbon content greater than 4.0 weight %.

Preferably the hardfacing weld deposit comprises a manganese content greater than 2.0 weight %.

Preferably the hardfacing weld deposit comprises additional strong carbide forming elements molybdenum, tungsten, titanium, vanadium, niobium and boron to a combined maximum of 15 weight %.

The present invention is described further by reference to the following Examples.

EXAMPLE 1

A ferroalloy welding consumable material, hereinafter referred to as a "blended ferroalloy material" was produced, in accordance with the present invention, by forming a homogeneous melt from HCFeCr and HCFeMn powders and free carbon in the form of graphite and thereafter casting the melt into a mould. Thereafter, the cast material was crushed to a fine powder The chemistry of the resultant blended ferroalloy material is set out in Table 3.

TABLE 3

Chemistry of Ferroalloy Powder Blend According to the Invention

| | Weight % | % Cr | % C | % Mn | % Fe |
|---|---|---|---|---|---|
| HCFeCr | 91 | 63.0 | 5.5 | | 31.5 |
| HCFeMn | 6 | | 7.0 | 75.0 | 18.0 |
| Carbon | 3 | | 100.0 | | |
| Final Blend | 100 | 57.3 | 8.4 | 4.5 | 29.8 |

It was evident from the Example that:

3 weight % carbon dissolved in the liquid metal increased the chemically combined carbon content of the final blend of ferroalloy powder from 5.6% C to 8.4% C.

HCFeCr feed material containing relatively low carbon contents (eg. 5.5% C) could be used rather than more expensive HCFeCr feed material containing higher carbon contents (eg. 8.5% C) used in the known ferroalloy powder blend in Table 1.

HCFeCr feed material containing relatively low chromium contents (eg. 63 weight % Cr) could be used rather than more expensive HCFeCr feed material containing higher chromium contents (eg. 67% Cr) used in the known ferroalloy powder blend in Table 1.

The chemical composition of the final ferroalloy blend was Fe-57.3Cr-8.4C-4.5Mn. This material was found to be brittle and friable and readily reduced to a fine powder by crushing in the usual manner.

The chromium/carbon ratio of the blended ferroalloy material of Table 3=57.3/8.4 ie for the Ferroalloy Powder Blend Cr/C = 6.82

The chemistry of a final hardfacing weld deposit formed using the blended ferroalloy material of Table 3 is provided in Table 4 by way of example.

TABLE 4

Chemistry of Hardfacing Weld Deposit According to the Invention

| | Weight % | % Cr | % C | % Mn | % Fe |
|---|---|---|---|---|---|
| Powder | 55 | 57.3 | 8.4 | 4.5 | 29.8 |
| Welding wire | 35 | | | 1.0 | 99.0 |
| Dilution | 10 | | 0.2 | 1.0 | 98.8 |
| Weld Deposit | 100 | 31.5 | 4.6 | 2.9 | 61.0 |

It is evident from Table 4 and additional work carried out by the applicant that:

The chromium content of the hardfacing weld deposit was reduced from 34.7% Cr in the prior art (Table 2) to 31.5% Cr in the present invention without reducing the carbon content.

The microstructure of the final weld deposit comprised about 50 volume percent $M_7C_3$ carbides.

The ratio of welding consumables and amount of dilution is identical with Table 2, ie there were no changes required in the hardfacing welding procedure used in the prior art.

The chromium/carbon ratio for the Hardfaced Weld Deposit of Table 4=31.5/4.6

Ie for the Hardfacing Weld Deposit Cr/C = 6.65

EXAMPLE 2

A blended ferroalloy material was produced, in accordance with the present invention, by the same method as described above for Example 1.

The only difference between the Examples is that this Example used scrap steel to further reduce the Cr/C ratio of the final blend. The scrap steel was added to the molten ferroalloy blend, resulting in a reduction in the chromium content and raw material costs.

Table 5 provides the chemistry of the blended ferroalloy material.

TABLE 5

| Chemistry of Ferroalloy Powder Blended with Scrap Steel According to the Invention | | | | |
|---|---|---|---|---|
| | Weight % | % Cr | % C | % Mn | % Fe |
| HCFeCr | 70 | 63.0 | 5.5 | | 31.5 |
| HCFeMn | 6 | | 7.0 | 75.0 | 18 |
| Steel Scrap | 20 | | 0.2 | 1.0 | 98.8 |
| Carbon | 4 | | 100.0 | | |
| Final Blend | 100 | 44.1 | 8.3 | 4.7 | 42.9 |

It is evident from the Example that:
Scrap steel (20 weight %) lowered the chromium content of the final blend.
The chromium content of the ferroalloy blend was reduced from 63.0% in the prior art ferroalloy powder blend (Table 1) to 44.1% in the blend of the present invention (Table 5).
The chemical composition of the final ferroalloy blend was Fe-44.1Cr-8.3C-4.7Mn. This material was found to be brittle and friable and readily reduced to a fine powder by crushing in the usual manner.
The chromium/carbon ratio of the blended ferroalloy material of Table 5=44.1/8.3

Ie for the Ferroalloy Powder Blend Cr/C = 5.31

The chemistry of a final hardfacing weld deposit formed using the blended ferroalloy material of Table 5, ie incorporating scrap steel, is provided in Table 6.

TABLE 6

| Hardfacing Weld Deposit Produced with Ferroalloy Powder Blended with Scrap Steel | | | | | |
|---|---|---|---|---|---|
| | Weight % | % Cr | % C | % Mn | % Fe |
| Powder | 55 | 44.1 | 8.3 | 4.7 | 42.9 |
| Welding wire | 35 | | | 1.0 | 99.0 |
| Dilution | 10 | | 0.2 | 1.0 | 98.8 |
| Weld Deposit | 100 | 24.3 | 4.6 | 3.0 | 68.1 |

The chromium content of 24.3 weight % of the hardfacing weld deposit of Table 6 is similar to the chromium content of wear resistant white cast irons in ASTM A532. At the same time, the chemically combined carbon content was 4.6 weight % yielding a microstructure exhibiting about 45 volume % $M_7C_3$ carbides.

EXAMPLE 3

A blended ferroalloy material was produced, in accordance with the present invention, by the same method as described above for Example 1.

The only difference between the Examples is that this Example used scrap white cast iron to further reduce the Cr/C ratio of the final blend. The scrap white cast iron was added to the molten ferroalloy blend, resulting in a reduction in the chromium content and raw material costs. In particular, the scrap white cast iron resulted in a further reduction in the amount of HCFeCr in the powder blend and a corresponding reduction in the raw material costs Table 7 provides the chemistry of the blended ferroalloy material.

TABLE 7

| Chemistry of Ferroalloy Powder Blended with Scrap White Cast Iron According to the Invention | | | | | |
|---|---|---|---|---|---|
| | Weight % | % Cr | % C | % Mn | % Fe |
| HCFeCr | 55 | 63.0 | 5.5 | | 31.5 |
| HCFeMn | 6 | | 7.0 | 75.0 | 18 |
| Scrap WCI | 35 | 27.0 | 3.0 | 1.5 | 68.5 |
| Carbon | 4 | | 100.0 | | |
| Final Blend | 100 | 44.1 | 8.5 | 5.0 | 42.4 |

The chemistry of the blended ferroalloy material of Table 7 was almost identical with the blend illustrated in Table 5 even though only 55 weight % of HCFeCr is used in the furnace charge material.

The chromium/carbon ratio of the blended ferroalloy material of Table 7=44.1/8.5 ie for the Ferroalloy Powder Blend Cr/C = 5.19

Many modifications may be made to the embodiments of the present invention described above without departing from the spirit and scope of the invention.

The invention claimed is:

1. A method of producing a chromium carbide-containing ferroalloy welding consumable material for subsequent use for producing a hardfacing on a suitable substrate comprising the steps of:
   (a) forming a homogeneous melt from a chromium-containing ferroalloy material and a source of free carbon by melting the chromium-containing ferroalloy material and the source of free carbon at a melt temperature and holding the melt temperature to dissolve carbon in the melt; and
   (b) forming, from the melt, a solid carbide-containing ferroalloy welding consumable material having a concentration of chemically combined carbon such that a chromium/carbon ratio is less than 7.0 and having a chromium content in a range of 30-65% by weight, wherein the melt temperature is held for a time to produce the concentration of chemically combined carbon in the ferroalloy welding consumable material.

2. The method of claim 1 wherein step (a) comprises adding graphite to the melt to supersaturate the melt with carbon.

3. The method of claim 1 wherein step (a) comprises forming the homogeneous melt with an iron-containing material other than a chromium-containing ferroalloy to dilute the chromium concentration in the melt.

4. The method of claim 1 comprising de-gassing the melt formed in step (a) so that the solid ferroalloy welding consumable material formed in step (b) facilitates a stable welding arc in a subsequent hardfacing operation and thereby minimises porosity in the resultant hardfacing and eliminates ejection of ferroalloy powder from the weld pool.

5. The method of claim 1 comprising removing slag from the melt formed in step (a) so that the solid ferroalloy welding consumable material formed in step (b) minimises the presence of non-metallic impurities in the resultant hardfacing weld deposit formed in the subsequent hardfacing operation.

6. The method of claim 1 wherein the ferroalloy welding consumable material has a chemically combined carbon content greater than 7.5% by weight.

7. The method of claim 1 wherein step (b) comprises casting the melt into a suitable mould(s) or other casting means and thereafter breaking up the cast product into a suitable form, such as powder form.

8. The method of claim 1 wherein step (b) comprises atomising the melt with a suitable gas to form solid powder from the melt.

9. The method of claim 3, wherein the iron-containing material is selected from the group consisting of scrap steel and scrap high chromium white cast iron.

10. The method of claim 8, wherein the suitable gas is argon.

11. The method of claim 1, wherein the melt temperature is held for 30 to 60 minutes.

* * * * *

UNITED STATES PATENT AND TRADEMARK OFFICE
CERTIFICATE OF CORRECTION

PATENT NO. : 8,941,032 B2
APPLICATION NO. : 10/598058
DATED : January 27, 2015
INVENTOR(S) : Kevin Francis Dolman Page 1 of 1

It is certified that error appears in the above-identified patent and that said Letters Patent is hereby corrected as shown below:

Title Page, item (87) PCT Pub. Date: please delete "Aug. 28. 2005" and insert therefor
-- Aug. 25, 2005 --

Signed and Sealed this
Twenty-fourth Day of November, 2015

Michelle K. Lee
*Director of the United States Patent and Trademark Office*